(Model.)

R. A. WENTWORTH.
FISH TRAP.

No. 263,638.  Patented Aug. 29, 1882.

WITNESSES:
Fred. G. Dieterich
Charles H. Baker

INVENTOR.
Richmond A. Wentworth
by Louis Bagger & Co.
ATTORNEYS.

UNITED STATES PATENT OFFICE.

RICHMOND A. WENTWORTH, OF APPLETON, MAINE.

FISH-TRAP.

SPECIFICATION forming part of Letters Patent No. 263,638, dated August 29, 1882.

Application filed June 17, 1882. (Model.)

*To all whom it may concern:*

Be it known that I, RICHMOND A. WENTWORTH, of Appleton, in the county of Knox and State of Maine, have invented certain new and useful Improvements in Fish-Traps; and I do hereby declare that the following is a full, clear, and exact description of the invention, which will enable others skilled in the art to which it appertains to make and use the same, reference being had to the accompanying drawings, which form a part of this specification, and in which—

Figure 1:
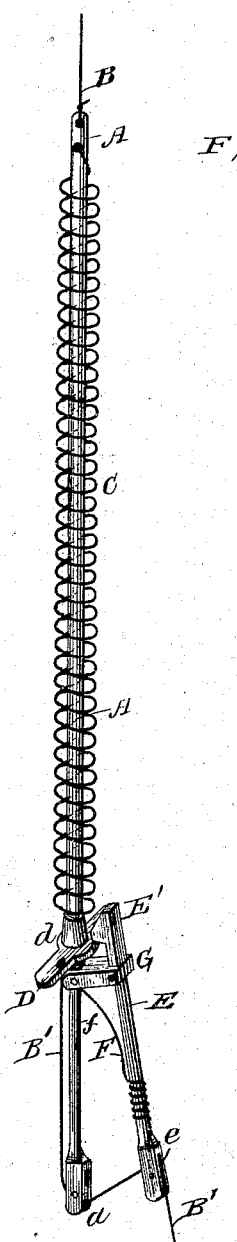
Figure 2:
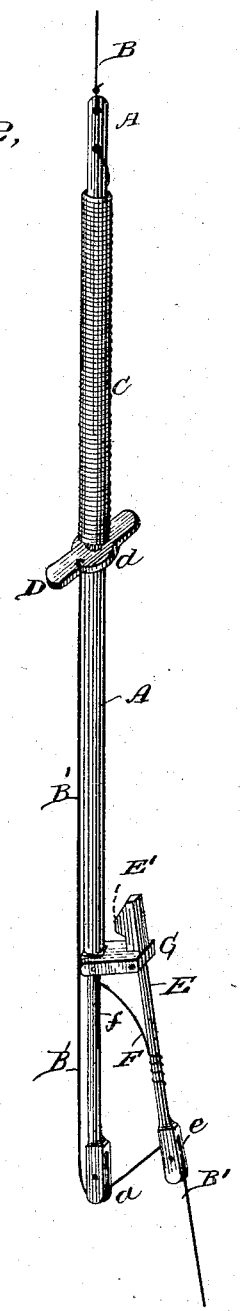

Figure 1 is a perspective view, showing my fish-trap "set;" and Fig. 2 is a similar view, showing it "sprung."

Similar letters of reference indicate corresponding parts in both the figures.

My invention has relation to that class of spring attachments for fishing-lines in which the bait-hook and line, when pulled by the fish taking the bait, operates a trigger, releasing the spring so as to suddenly jerk the hook into the mouth of the fish biting; and it consists in the construction and combination of parts of the same, as hereinafter more fully described and claimed.

In the accompanying drawings, the letter A represents a steel rod, (or other metal may be used, if desired,) which has an eye or hole at its upper end for the attachment of the line. (Shown at B.) Encircling the upper end of this rod, and fastened with one end near its top, is a coiled spring, C, the lower end of which is fastened in a cross-piece, D, which slides upon rod A, and has an enlargement, d, where the rod passes through it.

To the cross-piece D is fastened the lower part, B', of the fish-line, to which the bait-hook H is attached. This part of the line passes down along rod A and over a small sheave, a, at its bifurcated lower end. From here it passes through the forked lower end of the trigger E and over a little sheave or roller, e, inserted therein.

Upon the lower end of the trigger is placed a spring, F, the free end of which bears against the lower part of rod A, which is grooved longitudinally at f to receive the end of the spring and prevent it from slipping sidewise. By moving spring F up or down upon the trigger the force or power required to spring the trap may be adjusted at pleasure, according to the size and species of fish which it is desired to catch. The upper part of the trigger is hinged in a short arm, G, which is fastened upon and projects from rod A.

From the foregoing description, taken in connection with the drawings, the operation of this device will readily be understood.

To set the trap the cross-piece D is drawn down upon the rod till it reaches and engages the lip E' of the trigger E. When the fish takes the bait the pull upon the hook-line B' will trip the trigger and disengage its lip from part D, the sudden contraction of the spring C jerking line B' upward, so as to jerk the hook into the roof of the mouth of the fish.

Having thus described my invention, I claim and desire to secure by Letters Patent of the United States—

The herein-described fish-trap or hook-spring, consisting of the rod A, spring C, sliding cross-head D, trigger E, having the adjustable spring F, and hook-line B', passing through the lower ends of rod A and trigger E, all constructed and combined to operate substantially as and for the purpose shown and set forth.

In testimony that I claim the foregoing as my own I have hereunto affixed my signature in presence of two witnesses.

RICHMOND A. WENTWORTH.

Witnesses:
WILLARD ROBBINS,
O. S. McCORRISON.